Aug. 16, 1927.
M. H. ALBERTS
1,639,157
TRAFFIC GATE STRUCTURE
Filed Feb. 1, 1926  4 Sheets-Sheet 1
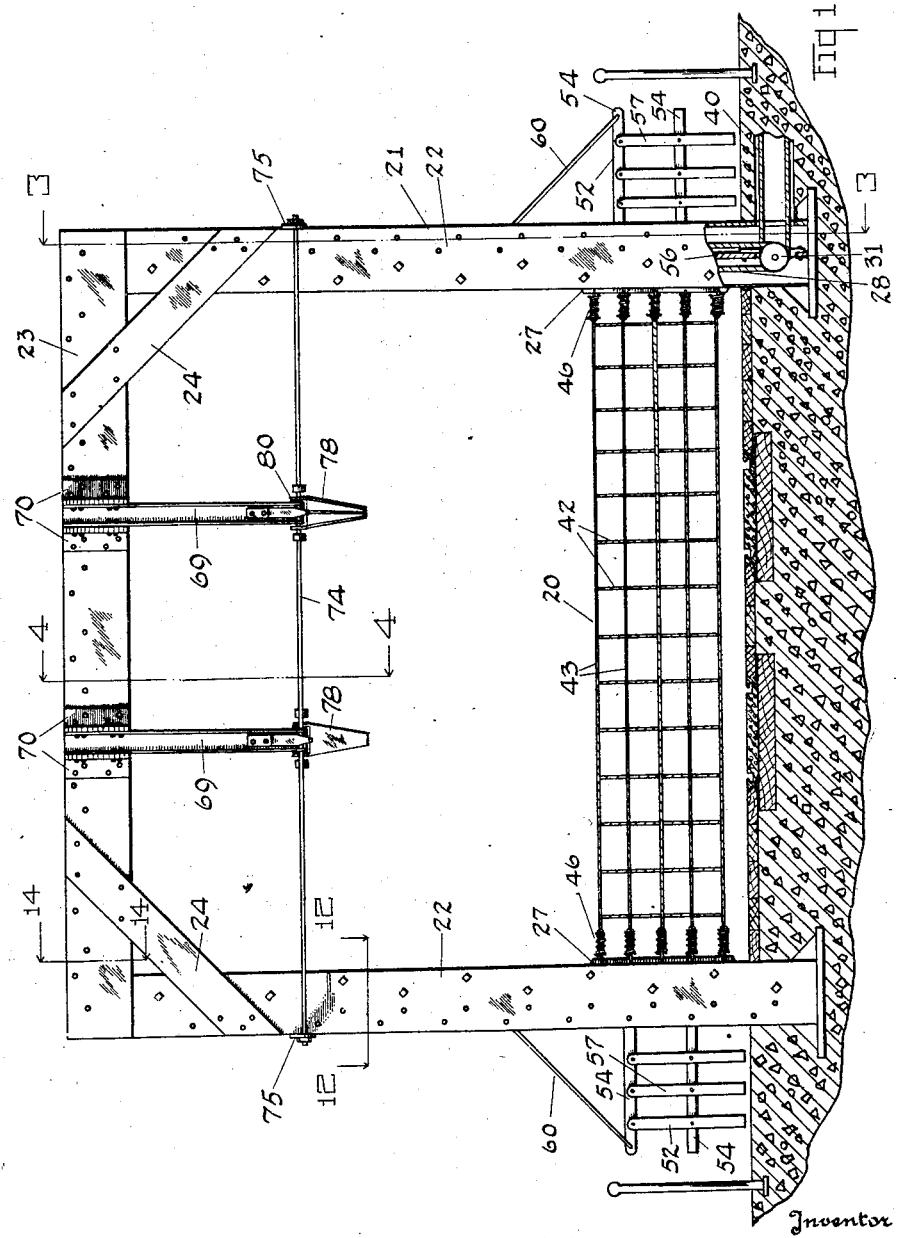
Inventor
Melvin H. Alberts
By Owen D. Owen,
Attorneys

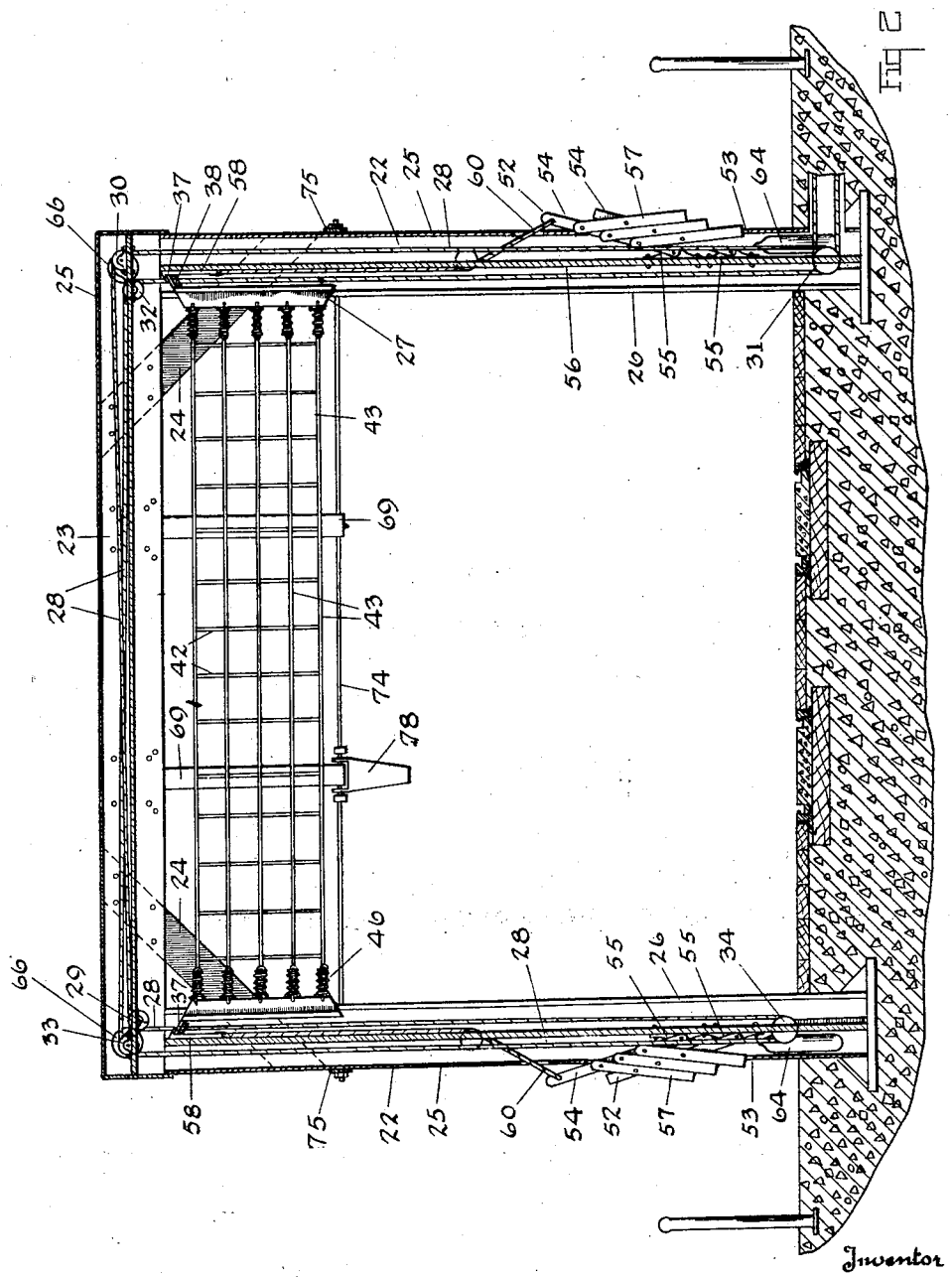

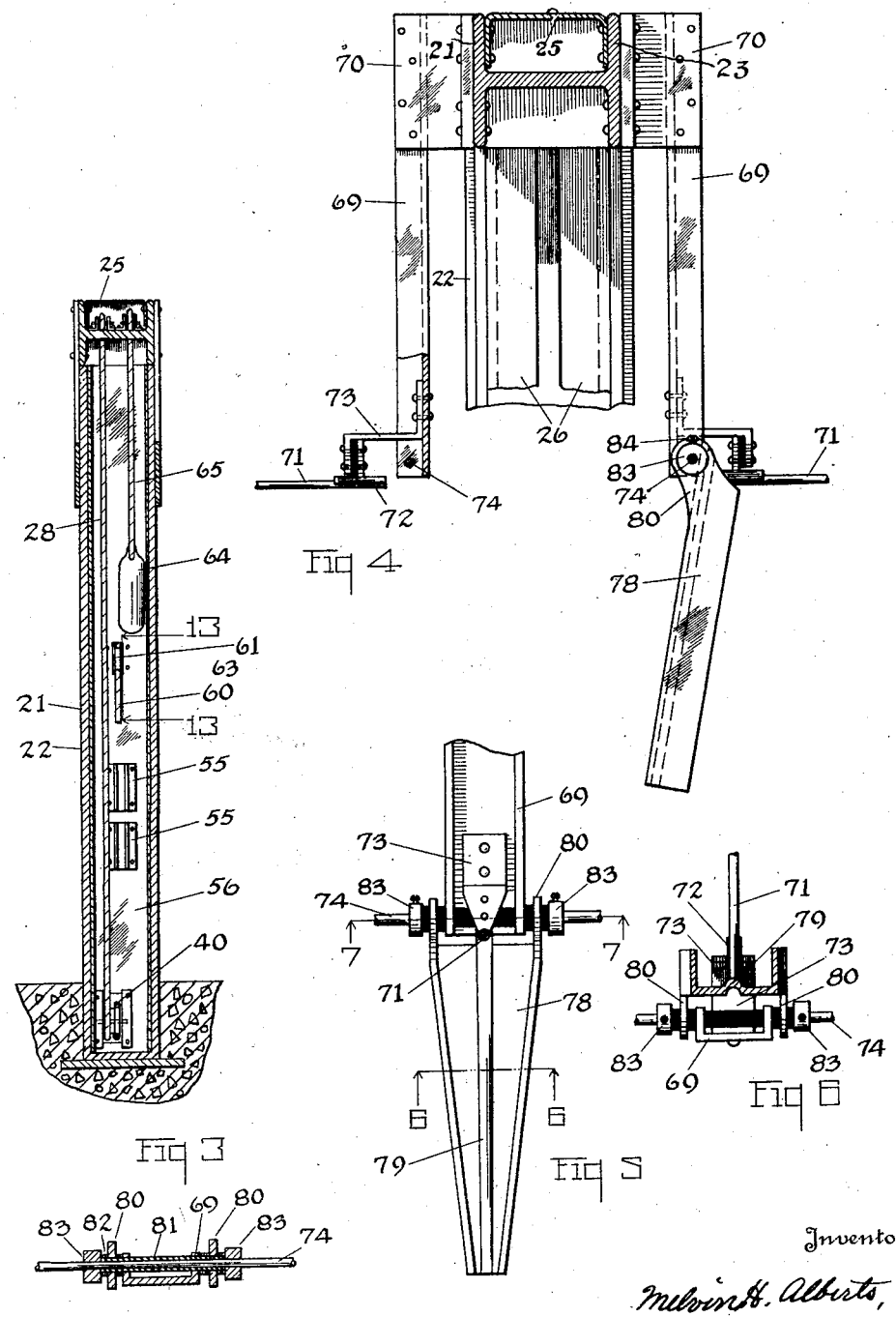

Aug. 16, 1927.  1,639,157
M. H. ALBERTS
TRAFFIC GATE STRUCTURE
Filed Feb. 1, 1926  4 Sheets-Sheet 4
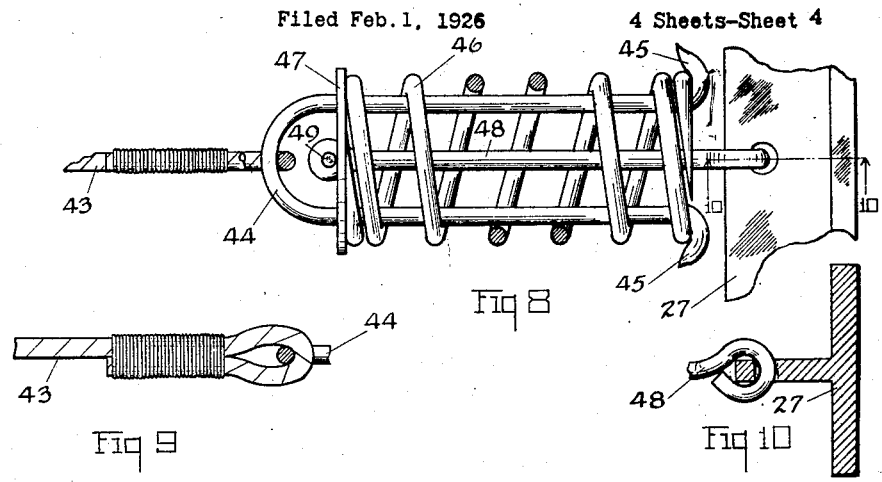
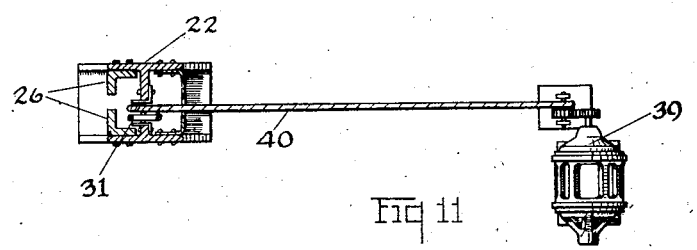
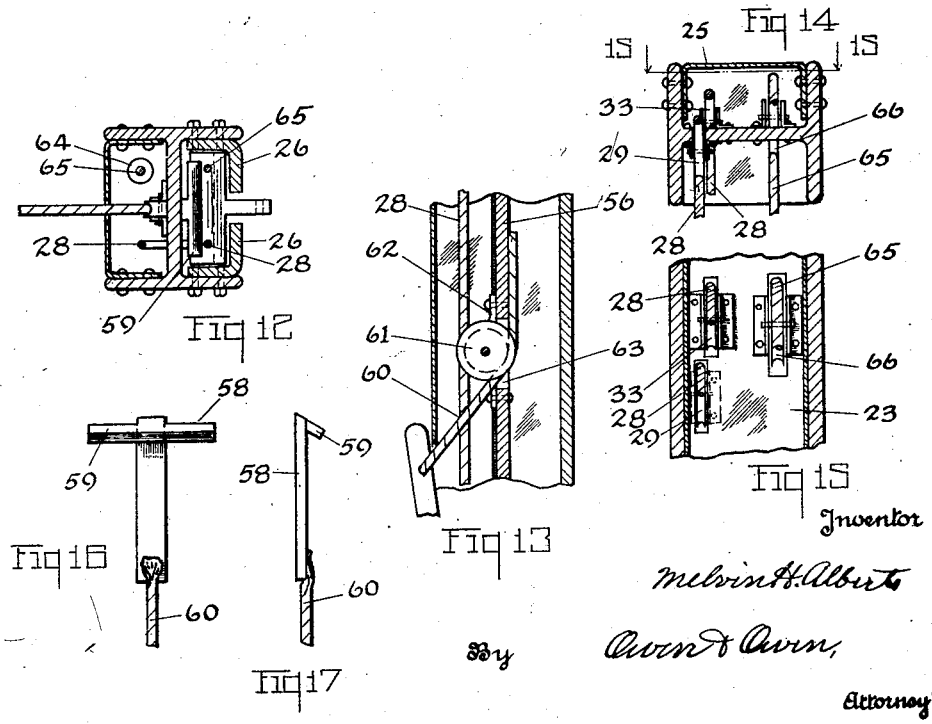
Inventor
Melvin H. Alberts
By Owen & Owen
Attorney Patented Aug. 16, 1927.

1,639,157

UNITED STATES PATENT OFFICE.

MELVIN H. ALBERTS, OF BATTLE CREEK, MICHIGAN.

TRAFFIC-GATE STRUCTURE.

Application filed February 1, 1926. Serial No. 85,310.

This invention relates to trolley bridges, and an object of this invention is to provide a new and improved trolley bridge having novel features of construction to prevent disengagement of the trolley therefrom.

The invention consists in other features that are apparent from the following description and upon examination of the drawings.

The invention may be embodied in traffic gate structures that differ in their details and, to illustrate, a practical application and describe its operation, I have selected an embodiment of the invention as an illustration of the many structures that contain the invention and shall describe it hereinafter. The particular structure selected as an example is shown in the accompanying drawing.

Figure 1 of the invention illustrates a side view of the traffic gate structure. Fig. 2 illustrates a vertical section of the structure shown in Fig. 1. Fig. 3 is a view of a section taken on the plane of the line 3—3 indicated in Fig. 1. Fig. 4 is a view of a section taken on the plane of the line 4—4 indicated in Fig. 1. Fig. 5 illustrates a view of a pivoted trolley contact trough. Fig. 6 illustrates a view of a section taken on the plane of the line 6—6 indicated in Fig. 5. Fig. 7 illustrates a view of a section taken on the plane of the line 7—7 indicated in Fig. 5. Fig. 8 is an enlarged view showing a part of the gate. Fig. 9 illustrates a view of a cable forming a part of the gate. Fig. 10 is a view of a section taken on the plane of the line 10—10 indicated in Fig. 8. Fig. 11 is a view of a means for operating the traffic gate. Fig. 12 is a view of a section taken on the plane of the line 12—12 indicated in Fig. 1. Fig. 13 is a view of a section taken on the plane of the line 13—13 indicated in Fig. 3. Fig 14 is a view of a section taken on the plane of the line 14—14 indicated in Fig. 1. Fig. 15 is a view of a section taken on the plane of the line 15—15 indicated in Fig. 14. Fig. 16 is a view of a hook member for raising a side gate. Fig. 17 is a side view of the member shown in Fig. 16.

In the form of structure containing my invention and which is shown in the drawings, a movable gate member 20 is supported and guided in a frame 21 that may be formed of suitable rolled iron of desired shapes. In the particular structure the main supporting parts are formed of H-iron and consist of the uprights 22 and the top cross member 23 that are suitably riveted and secured together and are braced by means of the bars 24. The interior of the H-bars 22 and 23 are closed by suitable sheet metal shaped parts 25 and the L-bars 26. The L-bars 26 are so positioned that their inner edges are located in spaced relation so as to form a slot for guiding the movable gate member 20.

The movable gate 20 is provided with a pair of end members 27 that may be formed of T-bars and which are located within the uprights 22, the sides of the edge portions of the L-bars 26 constituting a guide for the gate 20, and over which the end members 27 slide as the gate is raised and lowered. The gate is raised by a set of parallel maintaining pulleys and lines, by which is meant to describe a mechanical elemental movement and structure whereby the gate will be maintained at all times parallel to the surface of the road or pavement across which the gate extends notwithstanding the position to which it may be raised by a force exerted on either end, or any part of the gate. Thus the gate is connected at one of its ends to the line 28 that passes over the pulleys 29, 30, 31, and is connected to the gate at its other end. The line extends from this point over the pulleys 32, 33, and 34 to the first end of the gate. The operation of the parallel maintaining means is such, for example, that if one end of the movable gate member is drawn downward the line 28 passes over the pulleys to the opposite side of the supporting structure and downward to the lower end of the supporting structure and up to the gate so that when that portion of the line is drawn over the pulleys the other end of the gate will also be drawn downward in the manner well known in the art. Of course, when one end of the gate is raised the reverse occurs to raise the other end of the gate. The end members 27 are bent inwardly with respect to the supporting structure so as to form an inwardly extending lug or flange 37 through which the cable 28 extends and a locking means 38 such as lumps of metal having low fusibility, that may be formed by casting them about the cable and beneath the lugs or flanges 37 whereby the gate will be supported on the cable 28 and raised and lowered with the movements of the cable while being guided within the structure 21.

In order to raise and lower the gate, any suitable means may be used. In Fig. 11 is shown a conventional arrangement whereby one of the pulleys, such as the pulley 31 may be rotated by the operation of the electric motor 39 whose circuit may be closed and opened and made to drive the belt 40 that will cause the rotation of the pulley wheel 31 and consequently move the cable 28 to raise and lower the gate. If desired suitable automatic means may be provided for opening the circuit of the motor when the gate has been moved to its extreme positions with reference to the supporting structure 21.

The traffic gate structure, which has been selected as an example, is particularly adapted to support resilient traffic gates, which will elastically receive the impact of any car that may be properly driven or controlled when approaching the gate and so as to strike the gate when it is in closed position. The end members 27 of the gate being moved relative to each other by the parallel maintaining lines and pulleys so as to maintain the said end members 27 always at the same height, may be connected by cables 43 that have a certain amount of elasticity and will prevent undue damage to a car that may collide with the gate. The cables 43 are preferably connected together by means of cross cables 42 so as to form a net work to prevent the spreading of the cables 43 and form a resilient gate structure for the protection of the cars, as well as a gate structure that is light in weight. In order to further increase the elasticity of the gate structure the cables 43 may be provided with springs 46 (Fig. 8) so that when the cables are forced from the plane of the gate they will be returned when the pressure is removed. Furthermore the springs operate to keep the cables 43 taut and eliminate the sag which gives an unattractive appearance to the gate. The springs may be located at any point in the cables 43. In the form of construction shown the springs are located at the ends of the cables. Thus the cables are connected to the end parts 27 of the gates through the bent U-shaped bars 44, as best shown in the enlarged view illustrated in Fig. 8. The ends of each bar 44 are hooked outward as at 45, and a spring 46 is located intermediate the hook portions 45 and a washer or disc 47. A link 48 is secured to the end part 27 of the gate and is located within the U-member 44. It has a pin 49 that engages the washer or disc 47 to hold the washer or disc 47 in position notwithstanding the pressure that may be produced by the spring 46. Should a vehicle forcibly encounter the traffic gate, the cables 43 will be pushed outward and the springs 46 thereby compressed yieldingly to resist such force. As soon as the pressure against the gate is released, the springs 46 draw the gate back to normal position. The cables 43 may thus be maintained taut and the sagging eliminated.

Where it is desired to close the foot passage ways of traffic to prevent individuals walking across the area that it is desired to close off, side gates 52 are pivotally supported to the uprights 22. Preferably the sheet metal parts 25 are provided with slots 53 and the horizontal gate bars 54 extend through the slots 53 and are pivotally connected to the brackets 55 that are bolted to the webs 56 of the H-irons which form the uprights 22 of the supporting structure. The vertical gate bars 57 are pivotally connected to the horizontal bars 54 so that when the outer ends of the horizontal bars 54 are raised the gates will be folded together and large portions thereof moved within the slots 53 into the uprights 22 of the supporting structure to leave a substantially clear passage way for pedestrians.

The side gates 52 are preferably raised automatically when the main traffic gate 20 is raised. This may be accomplished by connecting the side gates 52 to part of the cable 28. In order that there may be proper coordination between the movements of the main traffic gate and the side gates, hook members are located in the uprights 22 and are movable along the webs 56 of the H-irons that form the main supporting part of the structure. The hook members 58 have engaging flanges 59 that extend across the major distance between the L-bars 26 that form the guides for the ends 27 of the gate 20 and so as to be caught by the lugs or flanges 37 that are formed by bending the upper end portions of the T-members that form the ends 27 of the gate and so that when the main traffic gate is raised the hook members 58 will be caught by the lugs or flanges 37 and raised by the upward movement of the gate. The hook members will thus be lowered when the main traffic gate is lowered. The side gates 52 are connected to the hook members 58 by means of the cables 60. The lower ends of the cables 60 are connected to the outer ends of the upper horizontal bars 54 of the side gates and so that when the main traffic gate is raised the side gate will be folded, largely within the vertical parts of the supporting structure 21. The cables 60 pass over pulleys 61 that are rotatably supported in brackets 62 that are bolted to the webs 56 of the uprights and are located in the slots 63 that are formed in the webs 56. The cables 60 pass from one side of the webs 56 around portions of the pulleys 61 and through the slots 63 to the other sides of the webs, in order to establish a connection between the main traffic gate that is located between the webs 56 of the uprights 22 and the side gates 52 which are located on the outsides of the webs 56.

The cables 60 may be secured to the lower ends of the hooks 52 by any suitable means such as spot welding or brazing. Also the main traffic gate may be suitably counterbalanced as by the weights 64 that are connected to cables 65 that pass over pulleys 66 and are connected at any desired points to the parts of the cables 28.

Where the traffic gate is used for closing traffic passage ways in which are located trolley car lines for overhead electric contact systems or wires, means is provided for opening the wires in order to permit the main traffic gate to be raised clear of the wires. In the form of construction shown in the drawings the juxtaposed ends of the main trolley wires are insulatingly supported on the structure by means of the depending channel bars 69 and the brackets 70 that are connected to the cross or top member 23 of the traffic gate structure. The wires 71 are connected to the T-shaped members 72 that are insulatingly connected to the Z-members 73 that are bolted to the channel bars 69. Thus the wires 71 may be drawn with the desired tautness, the connecting structure being sufficiently rigid to maintain the wires in position notwithstanding any reasonable strains to which the wires may be subjected, either in the erection of the trolley system or in the use to which they are subjected, in the operation of the system. Preferably tension members 74 may be connected to cross bars 75 and extended through the channel bars 69. The cross bars 75 may be secured to the uprights 22 of the traffic gate structure in any suitable manner. Where two trolley tracks extend along the traffic passage way, two pairs of depending channel bars 69 are secured to the top H-bar 23 on the advance side of the traffic gate structure with respect to the street car tracks, the channel bars 69 and the tension members 74 form a support for trolley line contact troughs having trolley wheel contact tracks. The troughs are pivotally supported relative to the depending channel members 69 and they are located in the line of the trolley wheels of the trolley cars and so that as the cars pass through the traffic structure the troughs will be engaged and raised in position to close the spaces between the ends of the main trolley line wires 71 to maintain the trolley wheel substantially in the horizontal plane of the end portions of the trolley wires 71, and, if desired, to maintain an electric connection from the trolley wires to the trolley car.

In the form of construction shown in the drawings the troughs 78 are preferably wedge shaped, as shown in Fig. 5, and the central portion of the trough is raised as at 79 so as to conform substantially to the grooved peripheral surface of the trolley wheel. The wider part of the trough being located at the point where the trolley wheel enters the trough or first comes into contact with the trough, the trolley wheel will not easily be thrown from the trough nor from the raised central portions 79 when the trolley wheel passes beneath the traffic gate. The trolley wheel will thus be guided along the central raised portion 79 of the trough in each case and be directed to that part of the trolley line 71 located on the following side of the traffic gate structure with respect to the direction of movement of the trolley car.

The troughs 78 are each provided with ears 80 through which a tension member 74 extends, also an insulating sleeve 81 is located within the ears 80 and insulating washers or short insulating sleeves 82 are located on opposite sides of ears 80. The sleeves 81 extend through the channel members 69 that pivotally support the troughs 78. The parts are secured in their relative positions by means of collars 83 that may be keyed to the tension members 74 by means of the screws 84. Thus the troughs 78 are pivotally supported by, and yet insulated from the traffic gate structure.

The ears 80 are so located with respect to the body portion of the troughs 78 that the raised portion 79 will be located in line with the end portions 71 of the trolley wire when the troughs 78 are raised by the trolley wheels. The upward swing movements of the trough 78 are limited by the ends of the channel members 69 located opposite the channel members 69 that pivotally support the troughs. Thus as the trolley contact wheels of the trolley cars pass through the traffic gate structure the trolley wheels will be guided from one end portion 71 of the main trolley wire to the other end portion 71. The traffic gate supporting structure is made sufficiently high to permit the main traffic movable gate member to pass above the trolley wires when the traffic passage ways are open whereby the street cars may readily pass through the traffic gate structure when the traffic gate is open.

I claim:

1. A trolley bridge comprising a depending wedge-shaped member positioned in the path of movement of the trolley wheel, and side flanges on said member to form a confining track for the trolley wheel.

2. A trolley bridge comprising a swinging wedge-shaped member positioned in the path of movement of the trolley wheel, the wider part of said member being first engaged by the trolley wheel, side flanges on said member to prevent disengagement of the trolley wheel therefrom in a lateral direction, and spring means for holding said member in a vertically disposed position.

3. The combination of a pair of uprights, a cross bar connecting the upper portions of said uprights, an arm depending from said cross bar, means for bracing said arm against lateral movements, a wedge-shaped trough pivoted to the lower end of said arm, spring means to hold said arm in vertical depending position, and a longitudinally extending raised portion on said trough over which a trolley wheel may pass.

In testimony whereof I have hereunto signed my name to this specification.

MELVIN H. ALBERTS.